United States Patent [19]

Sainio et al.

[11] Patent Number: 5,412,577
[45] Date of Patent: May 2, 1995

[54] COLOR REGISTRATION SYSTEM FOR A PRINTING PRESS

[75] Inventors: Jeffrey W. Sainio, Hartland; John C. Seymour, Jefferson, both of Wis.

[73] Assignee: Quad/Tech International, Sussex, Wis.

[21] Appl. No.: 967,978

[22] Filed: Oct. 28, 1992

[51] Int. Cl.⁶ ............................................. G06F 15/46
[52] U.S. Cl. .................................. 364/469; 101/181; 250/548; 250/561
[58] Field of Search ................ 364/469, 559; 226/30; 101/181; 250/548, 557, 561; 340/675

[56] References Cited

U.S. PATENT DOCUMENTS

| | | | |
|---|---|---|---|
| 3,114,797 | 12/1963 | Williams | 178/6.8 |
| 3,339,817 | 9/1967 | French | 226/100 |
| 3,915,090 | 10/1975 | Horst et al. | 101/426 |
| 4,232,336 | 11/1980 | Henry | 358/106 |
| 4,278,893 | 7/1981 | Kato et al. | 250/348 |
| 4,318,287 | 3/1982 | Stratton et al. | 364/469 |
| 4,428,287 | 1/1984 | Greiner | 101/170 |
| 4,437,403 | 3/1984 | Greiner | 101/248 |
| 4,528,630 | 7/1985 | Sargent | 364/469 |
| 4,532,596 | 7/1985 | Pugsley | 364/469 |
| 4,534,288 | 8/1985 | Brovman | 101/211 |
| 4,546,700 | 10/1985 | Kishner et al. | 101/211 |
| 4,552,608 | 11/1985 | Hoffmann et al. | 156/351 |
| 4,561,103 | 12/1985 | Horiguchi et al. | 382/1 |
| 4,569,584 | 2/1986 | St. John et al. | 355/14 R |
| 4,578,590 | 3/1986 | Wu | 250/548 |
| 4,582,768 | 4/1986 | Takeuchi et al. | 430/22 |
| 4,655,135 | 4/1987 | Brovman | 101/426 |
| 4,656,941 | 4/1987 | Brovman | 101/483 |
| 4,690,051 | 9/1987 | Kishine et al. | 101/211 |
| 4,719,575 | 1/1988 | Gnuechtel | 364/469 |
| 4,736,680 | 4/1988 | Wales et al. | 101/426 |
| 4,752,892 | 6/1988 | Lecha | 364/518 |
| 4,758,886 | 7/1988 | Rylander | 358/534 |
| 4,794,453 | 12/1988 | Gnuechtel et al. | 358/101 |
| 4,849,914 | 7/1989 | Medioni et al. | 364/525 |
| 4,860,650 | 8/1989 | Houser | 101/211 |
| 4,887,530 | 12/1989 | Sainio | 101/181 |
| 4,899,653 | 2/1990 | Michl et al. | 101/148 |
| 4,913,049 | 4/1990 | Sainio | 101/211 |
| 4,918,622 | 4/1990 | Granger et al. | 354/518 |
| 5,018,213 | 5/1991 | Sikes | 382/8 |
| 5,027,706 | 7/1991 | Niemiro et al. | 101/366 |
| 5,076,163 | 12/1991 | Sainio | 101/181 |
| 5,079,738 | 1/1992 | Bockenfeld | 395/800 |
| 5,113,252 | 5/1992 | Horie et al. | 358/77 |
| 5,119,132 | 6/1992 | Butler | 355/208 |
| 5,181,257 | 1/1993 | Steiner et al. | 382/17 |

FOREIGN PATENT DOCUMENTS 723320  12/1965  Canada .

OTHER PUBLICATIONS

"Digital Signal Processing", William K. Pratt, pp. 196–203 no date.

Primary Examiner—Jerry Smith
Assistant Examiner—Cameron H. Tousi
Attorney, Agent, or Firm—Foley & Lardner

[57] ABSTRACT

A control system is disclosed for controlling misregistration between the colors of an image printed on a web. The system includes an imaging device such as a camera or group of cameras, a processor, and image conversion circuits coupled to the processor. The system detects print color misregistration based upon the signals produced by the imaging device as a result of scanning the printed image. The conversation circuits convert the signals to signals usable by the processor to determine the color densities of the various colors within the image. These color densities are compared with reference color densities stored in a memory of the processor, where the reference color densities may be generated from a source such as the printing plates used to print the image for which misregistration is being monitored. Based upon the comparison of the color densities derived as a result of scanning the printed web, and the reference color densities, a processor operates to produce registration offset values between the printed colors which are used to control a print controller which controls the print units such that the colors of the printed image are placed into registration.

33 Claims, 13 Drawing Sheets
Microfiche Appendix Included
(1 microfiche, 58 pages)

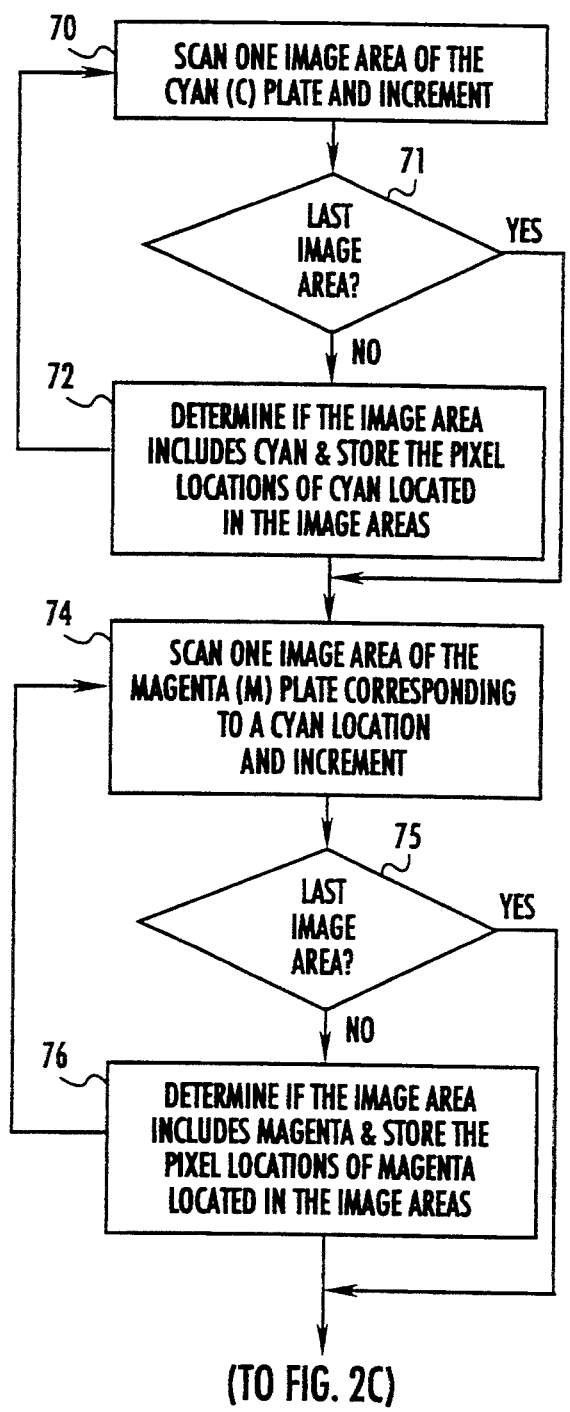
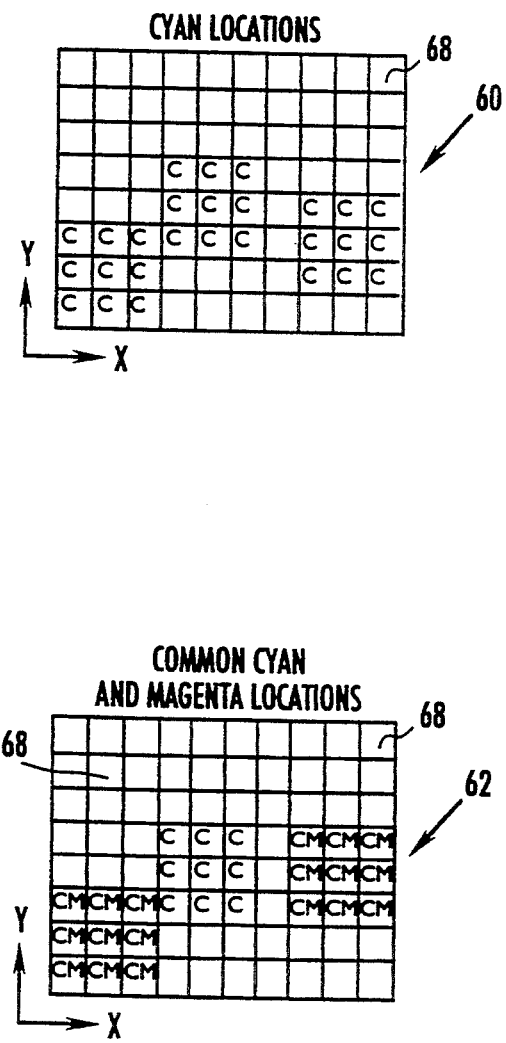
FIG. 2A
FIG. 2B

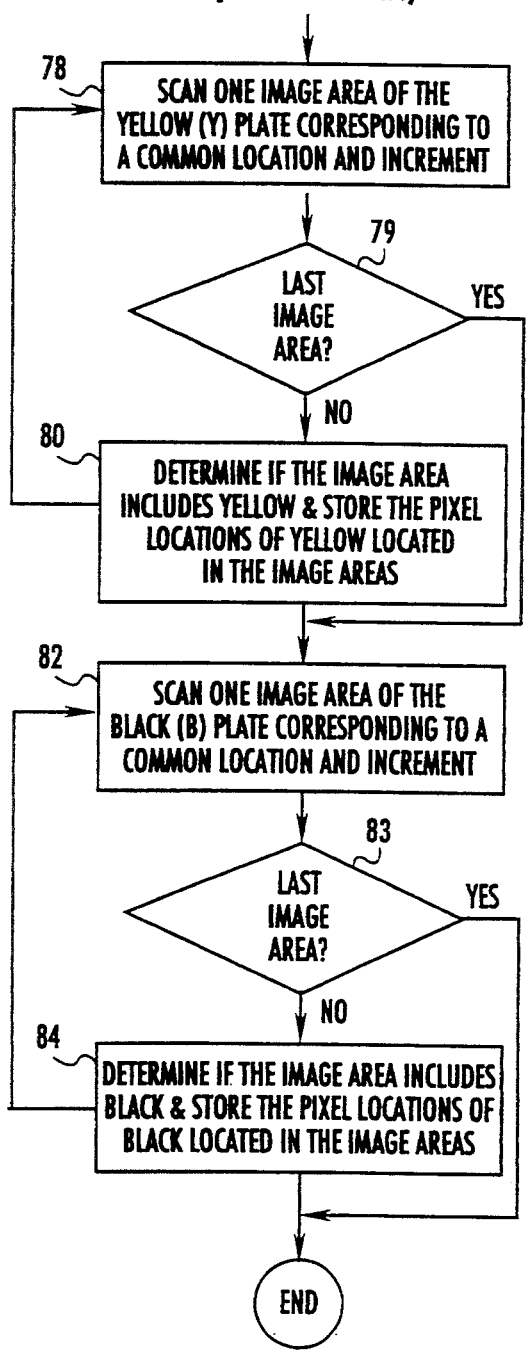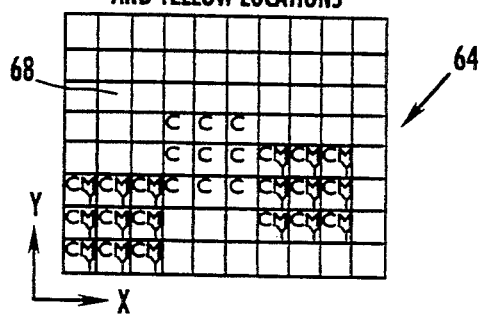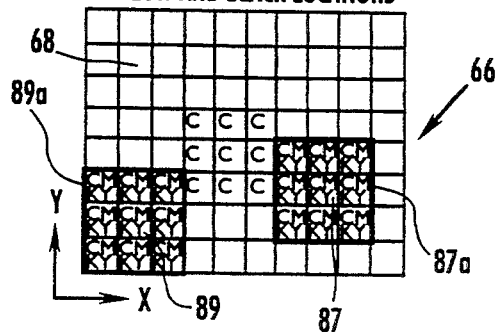
FIG. 2C
FIG. 2D

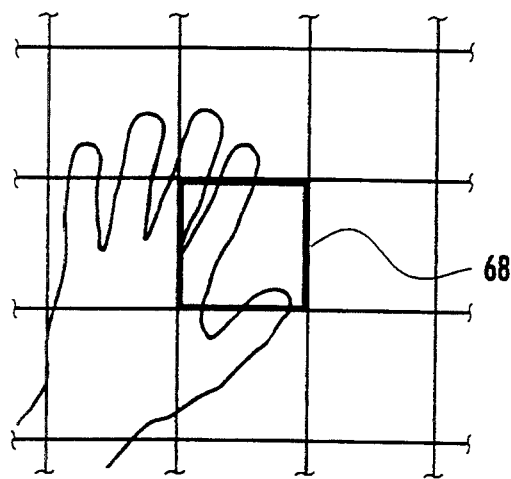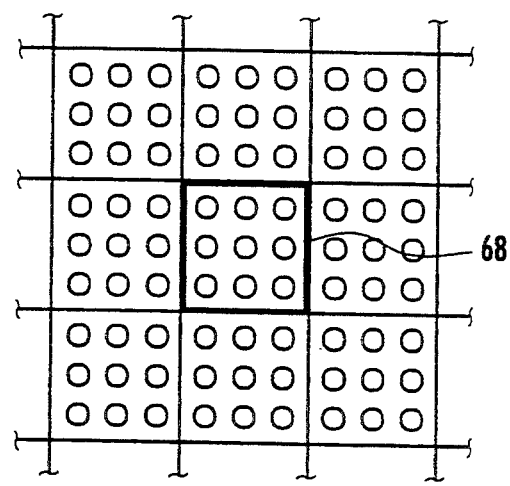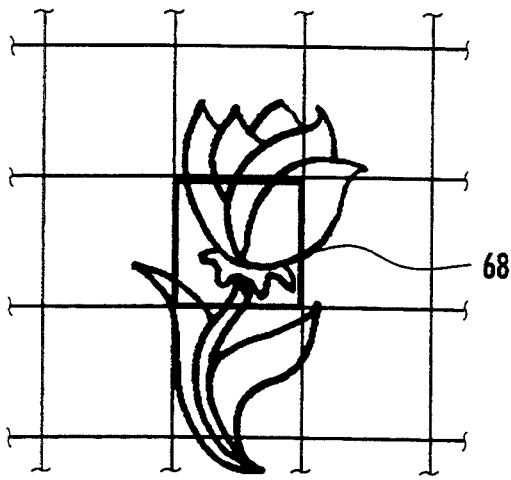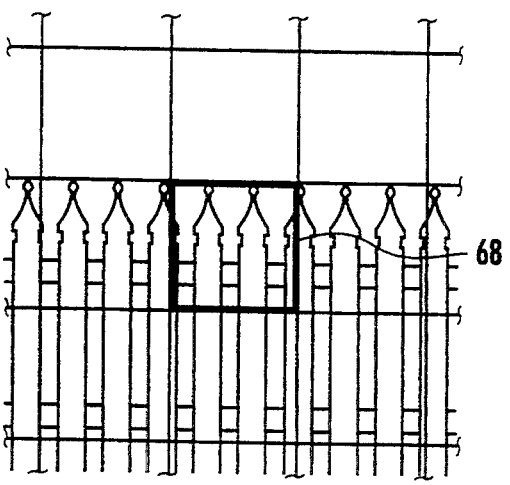
FIG. 2E  FIG. 2F

COLOR REGISTRATION SYSTEM FOR A PRINTING PRESS

MICROFICHE APPENDIX

The computer program referenced in the present application is included in a microfiche appendix which includes one (1) microfiche and is on a total of fifty-eight (58) frames.

FIELD OF THE INVENTION

The present invention relates to a system for monitoring a multi-color printing press and generating signals representative of misregistration between the colors. More particularly, the present invention relates to a system for monitoring and controlling registration based upon data produced by scanning a portion of the printed image.

BACKGROUND OF THE INVENTION

U.S. Pat. No. 4,887,530, issued to Jeffrey W. Sainio on Dec. 19, 1989, discloses a control system for adjusting the color-to-color registration of multi-color web-fed printing press systems. In general, the device utilizes a registration mark distinct from the printed image to provide color-to-color registration. An optical scanner scans registration marks each associated with one color of the printed image. The optical scanner provides information to a control system which allows the control system to determine the spatial relationship of the registration marks and control the printing units of the printing press system such that the registration of printed colors is corrected as necessary.

The system of U.S. Pat. No. 4,887,530 is reliable and has proven highly useful for maintaining color-to-color registration of multi-color prints. However, the requirement of a registration mark distinct from the image being printed requires additional paper which is discarded and adds cost to the printing process. Additionally, there are certain types of printed materials which do not provide a convenient area for applying registration marks. Accordingly, it would be advantageous to provide a system which is able to provide color-to-color registration based only upon the image being printed.

U.S. Pat. No. 4,736,680, issued to R. Langdon Wales and H. W. Crowley on Apr. 12, 1988, discloses a register control system for use with a four-color printing press which utilizes a camera to scan a selected area of an image and locate a black dot in the image. In addition to locating the black dot, the system scans the area about the black dot to locate yellow, magenta, and cyan dots. Based upon the known relationship between the black dot, and the yellow, magenta and cyan dots, the system calculates correction values for the X and Y coordinates, which are simply the distance between the theoretical location of the dots and their electronically observed positions. The correction values are utilized by a processor which applies correction values to the printing press to correct for misregistration.

Systems utilizing dots of a printed image to determine misregistration of the colors of a printed image suffer the problem of only being capable of providing registration for half-tone images. They are unable to provide registration for full-tone images. More specifically, in a half-tone image, dots exist since the image does not require printing upon 100% of the area of the web in the area where the image is printed. However, full-tone printing requires application of ink to 100% of the area within which the full-tone image is being printed. Accordingly, a full-tone image does not include dots which can be referenced to provide registration.

Accordingly, it would be advantageous to provide a color-to-color registration system capable of providing registration based upon a portion of a printed image including either half-tone or full-tone printing.

SUMMARY OF THE INVENTION

The present invention provides a system for generating a signal representative of color registration offset between at least first and second colors of an image printed on a web. The system includes a memory which stores a first reference array of digital data representative of a predetermined color density of the first color of at least a portion of the image and a second reference array of digital data representative of a predetermined color density of the second color of the portion. An imaging device is arranged in optical communication with the web to produce a first analog signal representative of the first color of the portion of the image and a second analog signal representative of the second color of the portion. The system also includes a converter circuit which is operatively associated with the imaging device and memory. This circuit converts the first analog signal to a first color array of digital data, and converts the second analog signal to a second color array of digital data. The first and second color arrays are then stored in the memory. A processing circuit in communication with the converter circuit and the memory is also provided in the system. The processing circuit includes a density conversion circuit which converts the first color array of digital data into a first density array of digital data representative of the color density of the first color and converts the second color array of digital data into a second density array of digital data representative of the color density of the second color. The processing circuit compares the first reference array with the first density array and compares the second reference array with the second density array to determine a registration offset between the first and second colors to produce a signal representative the registration offset between the colors.

The present invention further provides a system for generating a signal representative of color registration offset between at least first and second colors of an image printed on a web. The system includes a memory which stores a first reference array of digital data representative of a predetermined color density of the first color in at least a portion of the image and a second reference array of digital data representative of the predetermined color density of the second color of the portion. An imaging device in optical communication with the web produces a first analog signal representative of the first color of an area of the portion of the image and a second analog signal representative of the second color of the area. The system also includes a converter circuit operatively associated with the imaging device which converts the first analog signal to a first color array of digital data, converts the second analog signal to a second color array of digital data, and stores the first and second color arrays. A processing circuit in communication with the converter circuit and the memory is also provided. The processing circuit includes a density conversion circuit which converts the first color array of digital data into a first density array of digital data representative of the color density of the first color and converts the second color array of digital data into a second density array of digital data representative of the color density of the second color. The processing circuit compares the first reference array with the first density array and compares the second reference array with the second density array to determine a registration offset between the first and second colors and produces a signal representative of the registration offset.

The present invention further provides a system for generating a signal representative of color registration skew offset between at least first and second colors of an image printed on a web. The system includes a memory disposed to store a first reference array of digital data representative of a predetermined color density of the first color of at least first and second portions of the image and a second reference array of digital data representative of a predetermined color density of the second color of the first and second portions. The first portion is displaced from the second portion. An imaging device in optical communication with the web produces a first analog signal representative of the first color of the portions and a second analog signal representative of the second color of the portions. The system also includes a converter circuit operatively associated with the imaging device and memory. The circuit converts the first analog signal to a first color array of digital data, and converts the second analog signal to a second color array of digital data. The first and second color arrays are stored in the memory. A processing circuit in communication with the converter circuit and the memory is also provided in the system. The processing circuit includes a density conversion circuit which converts the first color array of digital data into a first density array of digital data representative of the color density of the first color and converts the second color array of digital data into a second density array of digital data representative of the color density of the second color. The processing circuit compares the first reference array with the first density array and compares the second reference array with the second density array to determine registration offsets between the first and second colors at the first and second portions, and produces a signal representative the skew offset between the colors based upon the first and second offsets.

The invention still further provides a system for positioning an imaging device relative to a printed image along at least one axis of the image. The device is positioned by a positioning unit to scan an area of the printed image and produce an analog signal representative of the color of an area of a portion of the image. The system includes a memory which stores a reference array of digital data representative of a predetermined color density of a color in at least a portion of the printed image and a converter circuit, operatively associated with the imaging device, which converts the analog signal to a color array of digital data, and stores the color array. The system also includes a processing circuit and memory. The processing circuit includes a density conversion circuit which converts the color array into a density array of digital data representative of the color density of the color and compares the reference and density arrays to determine a spatial relationship between the area and the portion along one axis and produces a control signal. The control signal is based upon the spatial relationship and controls the positioning unit.

BRIEF DESCRIPTION OF THE DRAWINGS

A preferred embodiment of the present invention will hereinafter be described in conjunction with the appended drawings, where:

FIGS. 2A and 2C are a flow chart for the process of determining color locations in printing plates;

FIG. 2C is a continuation of the flow chart in FIG. 2A for the process of determining color locations in printing plates;

FIGS. 2B and 2D illustrate scan grids made up of image scan areas;

FIG. 2D is a continuation of the scan grids in FIG. 2B made up of image scan areas;

FIG. 2E illustrates color shapes within scan areas suitable for registration;

FIG. 2F illustrates color shapes within scan areas which are generally unsuitable for registration;

FIG. 3A illustrates an exploded view of an image scan area;

FIG. 6B is the right side of a data flow diagram illustrating the comparison of on-press image densities to pre-press image densities to produce color offset data;

FIGS. 8 and 8A are a sectional view of the three dimensional graph of FIG. 7 taken along section line 8—8;

FIG. 8A illustrates an exploded view of the location of the maximum cross correlation value relative to the Y axis;

FTGS. 9 and 9A are a sectional view of the three dimensional graph of FIG. 7 taken along section line 9—9.

DETAILED DESCRIPTION OF A PREFERRED EMBODIMENT

Figure 1:
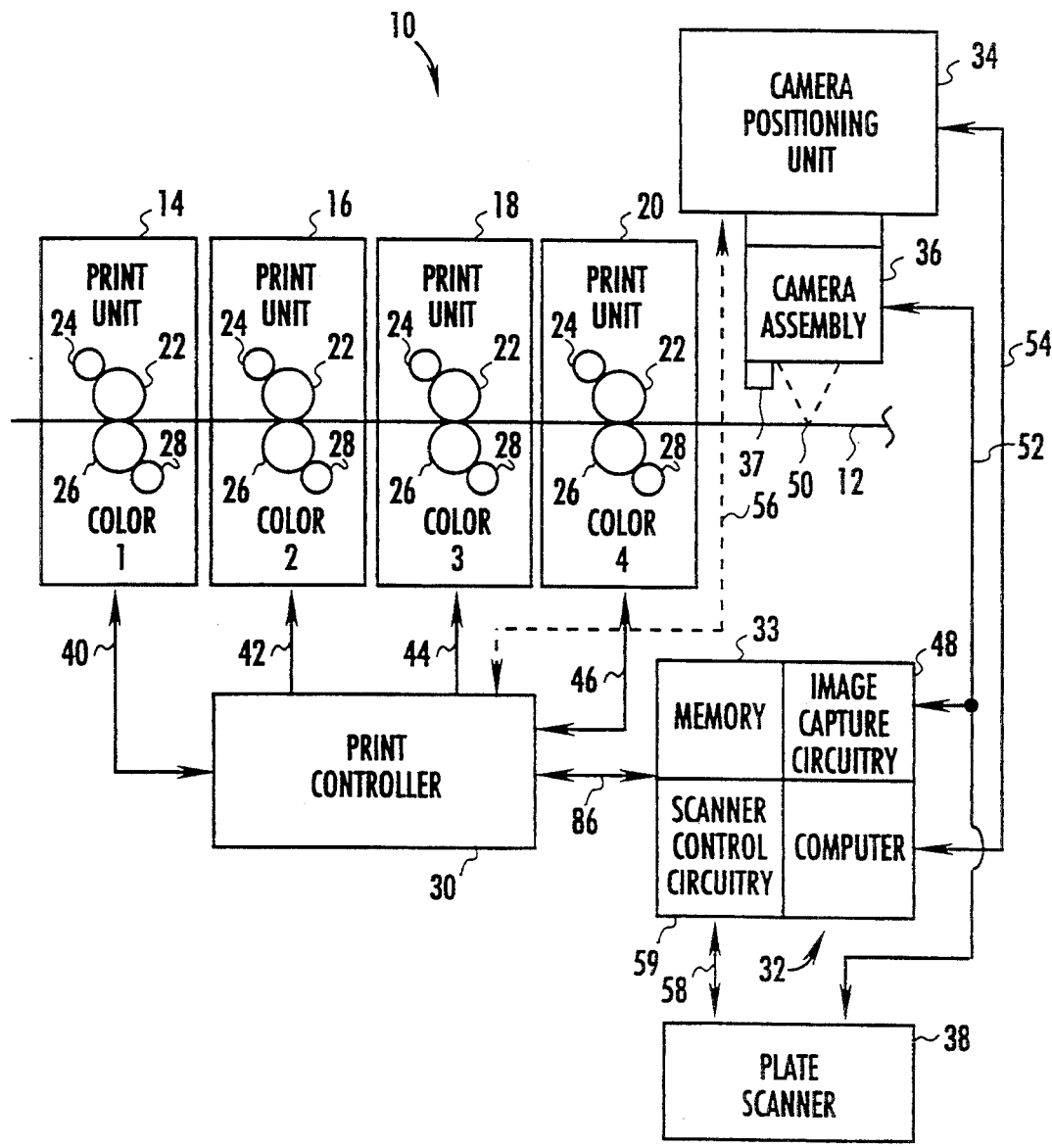
FIG. 1 is a block diagram of a printing system in accordance with the present invention.

Referring now to FIG. 1, a printing system 10 for printing a multi-color image upon a web 12 is illustrated. In the presently preferred embodiment, four printing units 14, 16, 18 and 20 each print one color of the image upon web 12. This type of printing is commonly referred to as web offset printing. Each print unit 14, 16, 18 and 20 includes an upper blanket cylinder 22, an upper printing plate cylinder 24, a lower blanket cylinder 26, and a lower printing plate cylinder 28. For typical printing processes, colors 1, 2, 3 and 4 on units 14, 16, 18 and 20, respectively, are cyan (C), magenta (M), yellow (Y) and black (K). The location of printing units 14, 16, 18 and 20 relative to each other is determined by the printer.

System 10 also includes a print controller 30, a computer 32, a camera positioning unit 34, a camera assembly 36, and a printing plate scanner 38. Print controller 30 serves as the interface between computer 32 and printing units 14, 16, 18 and 20. Controller 30 is coupled to units 14, 16, 18 and 20 by data buses 40, 42, 44 and 46, respectively, and coupled to computer 32 by data bus 86. Controller 30 converts the signals from computer 32 into signals which are applied to units 14, 16, 18 and 20, and transmits signals representative of the speed and registration of units 14, 16, 18 and 20 to computer 32. The signals produced by controller 30 have the proper (conventional) protocol to precisely control longitudinal, lateral and rotational positioning of cylinders 22, 24, 26 and 28 relative to moving web 12 such that the colors printed by units 14, 16, 18 and 20 are registered to produce a multi-color image having suitable quality.

Computer 32 may be of the conventional type including a 486 microprocessor and PC architecture. Computer 32 includes random access memory 33 (semiconductor memory and/or disk drive storage) and image capture circuitry 48 which interfaces with camera assembly 36 and plate scanner 38. Circuitry 48 includes four image capture boards which are connected to the expansion bus of computer 32. By way of example, the image capture boards may be of the bus board type manufactured by Matrox as Model No. PIP512.

In the present embodiment, the camera assembly 36 includes four cameras focused at the same position 50 of printed web 12. Each of the cameras of assembly 36 is coupled to one of the four image capture boards via a signal bus 52. The four cameras of assembly 36 may be black and white cameras having CCD imagers of the type manufactured by Sony as Model No. XC57. Each camera includes a different filter for scanning the printed image at location 50. Preferably, assembly 36 is configured to scan web 12 for red (R), green (G), blue (B) and infrared (I) colors. Accordingly, the first camera is fitted with a red filter, the second camera is fitted with a green filter, the third camera is fitted with a blue filter, and the fourth camera is fitted with an infrared filter. By way of example only, the filters may be of the type manufactured by Oriel Corporation of Stratford, Conn., where the red filter is Model No. 57610, the green filter is Model No. 57570, the blue filter is Model No. 57530, and the infrared filter is Model No. 57690. Signal bus 52 transmits image data from assembly 36 to image capture circuitry 48, and camera control data from circuitry 48 to assembly 36. Circuitry 48 includes video memory which is configured to store image data corresponding to one image scan of assembly 36. Camera assembly 36 also includes a light or strobe light assembly 37 which is coupled to computer 32 by signal bus 52.

By way of modification, it is contemplated that a single properly configured color camera having RGB and I outputs could be substituted for the black and white cameras. Additionally, it is contemplated that cameras having images other than CCD images (e.g., MOS imager) may be used, depending upon the requirements of a particular application.

Computer 32 is also connected to camera positioning unit 34 by data bus 54. Camera positioning unit 34 permits longitudinal (X axis) and lateral (Y axis) movement of assembly 36 relative to web 12. Assembly 36 is mechanically coupled to unit 34, and unit 34 permits movement of camera 36 relative to web 12, either longitudinally (X direction) or laterally (Y direction). The purpose of positioning assembly 36 is to allow selective scanning of portions of a printed image which are suitable for registration (discussed below). By way of modification, unit 34 may be coupled to print unit controller 30 by a data bus 56 which allows computer 32 to control the location of unit 34 via controller 30, where controller 30 provides circuitry necessary to interface unit 34 with computer 32. Where a strobe light is used, lateral (Y) positioning by unit 34 is not necessary since the timing of the strobe light effectively provides lateral positioning relative to the moving web.

Plate scanner 38 may be an X, Y flatbed scanner including a black and white camera of the same type used in assembly 36. The camera of scanner 38 is coupled to one of the image capture boards of image capture circuitry 48 by data bus 52 and coupled to scanner control circuitry 59 of computer 32 by data bus 58. Circuitry 59 may be the circuitry of computer 32 normally used to control a printer via a parallel or serial port of computer 32. Scanner 38 operates to scan each printing plate associated with the printing of a particular printed image and determine the location(s) in the image at which the colors (C, M, Y, K) of the image are being printed (described in detail below).

The general operation of system 10 will now be discussed in conjunction with FIG. 1. The first step of the printing process for a given image on web 12 is to individually scan the color 1 (cyan), color 2 (magenta), color 3 (yellow) and color 4 (black) printing plates. To scan each of the printing plates, the camera of scanner 38 is moved in the X and Y directions to view a plurality of image scan areas 68 of the plates which correspond in size to the scan area of the camera. Depending upon the printing press and plate size, the number of image scan areas 68 may vary. In the present example, each printing plate includes eight image scan areas 68 in the Y direction and ten image scan areas 68 in the X direction (80 total image scan areas). The purpose of providing plate scanning is to determine portions (reference areas) of the printed image produced by the C, M, Y and K printing plates which include all of the colors being printed (i.e., C, M, Y and K) where the colors have shapes within the portion which are suitable for registration (discussed below). However, in some situations, a single reference area including all four (4) colors and suitable for registration will not be found in one image scan area 68 of a printed image. In these situations, more than one reference area must be established, where the reference areas have at least one common color.

By way of modification, if the printing plates were produced by a system based upon digital data, a scanner 38 would not be required since the digital data used to produce the plates or the film which produces the plates could be used to directly establish the reference areas of a printed image. Additionally, scanner 38 could be a conventional flatbed scanner which is not required to interface with an image capture circuit 94, 96, 98 and 100.

FIGS. 2A, 2C and 2B illustrate the presently preferred embodiment of determining the reference areas of a printed image. In step 70, computer 32 applies control signals to scanner 38 via bus 58 such that each image scan area 68 is scanned by the camera of scanner 38. During scanning, the camera of scanner 38 transmits analog signals representative of the printing plate image in each image scan area. Referring to FIG. 2B, a scan grid 60 of areas 68 having the dimensions of a printing plate is shown. Areas 68 having the cyan color with a shape suitable for registration ("registrable" color) are marked with a "C". An area 68 is suitable for registration if the color within the area is distributed in such a way that it provides sufficient information to provide reliable registration. Characteristics of the shape of a color which provides an area 68 suitable for registration include: 1) edges which are non-linear; 2) patterns which do not repeat within the area 68; 3) edges which are discontinuous; or 4) multiple edges, linear or non-linear, at different orientations, The purpose of picking an area 68 which is suitable for registration is to register based upon a color shape which is distinct from shapes of that color in adjacent areas 68. FIG. 2E illustrates examples of color shapes within areas 68 which are suitable for registration. FIG. 2F illustrates examples of color shapes which may not be suitable for registration.

Where scanner 38 is a flatbed scanner which scans a full printing plate, computer 32 is programmed to determine registrable areas from the data derived from the complete scan.

In step 72, computer 32 determines if the scanned area 68 includes registrable cyan and stores the locations of areas 68 including registrable cyan, and the pixel locations of registrable cyan within each area 68. Step 71 allows computer 32 to control scanner 38 such that areas 68 are scanned incrementally until the last area is scanned.

Steps 74, 75 and 76, 78, 79 and 80, and 82, 83 and 84 are the same as steps 70, 71 and 72, respectively, with the exception that steps 74 and 76, 78 and 80, and 82 and 84 are performed for the magenta, yellow and black printing plates, respectively. Additionally, steps 74, 75 and 76 are only performed for areas 68 which include registrable cyan, steps 78, 79 and 80 are only performed for areas 68 which include registrable cyan and magenta, and steps 82, 83 and 84 are only performed for areas 68 including registrable cyan, magenta and yellow.

Referring again to FIGS. 2B and 2D, areas 68 including registrable cyan and magenta are marked with "CM" in scan grid 62, areas 68 including registrable cyan, magenta and yellow are marked with "CMY" in scan grid 64, and areas 68 including all four registrable colors are marked with "CMYK" in scan grid 66. This process of scanning the printing plates reduces scanning and computer time by reducing the number of areas 68 scanned necessary to determine the reference areas. More specifically, for this exemplary set of printing plates, only 143 (80+27+18+18) areas 68 were scanned instead of scanning 320 (80+80+80+80) areas 68.

The preceding description regarding FIGS. 2A, 2C, 2B and 2D concerns an exemplary set of CMYK plates. However, printing plate sizes and color locations will change according to the colors of the printed image produced by the plates. Additionally, as discussed above, some printed images may not include all four colors having shapes suitable for registration in one image scan area 68. Thus, the process of scanning the printing plates will require that computer 32 store color distribution data for separate image scan areas 68 (reference areas) where the reference areas both include at least one common color having a shape suitable for registration, and the combination of the reference areas include all of the colors used to print the image. For example, registrable black, yellow and magenta may not simultaneously be present in any of image areas 68. In this situation, the selected reference areas would all include registrable cyan, and the combination of the reference areas would include registrable cyan, magenta, yellow and black.

Of course, depending upon the hardware and software chosen, it may not be necessary to optimize the scanning process in the above-described manner since this process is typically only performed once for the printing of a given image by system 10. Additionally, camera technology may develop to the point where economically practical cameras have enough resolution to increase the size of image scan areas 68.

Figure 3A:
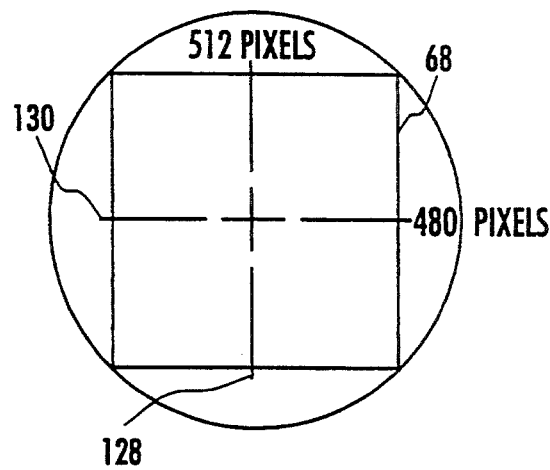
FIGS. 3 and 3A illustrates the configuration of a scanning grid for a plate scanner.
Figure 3:
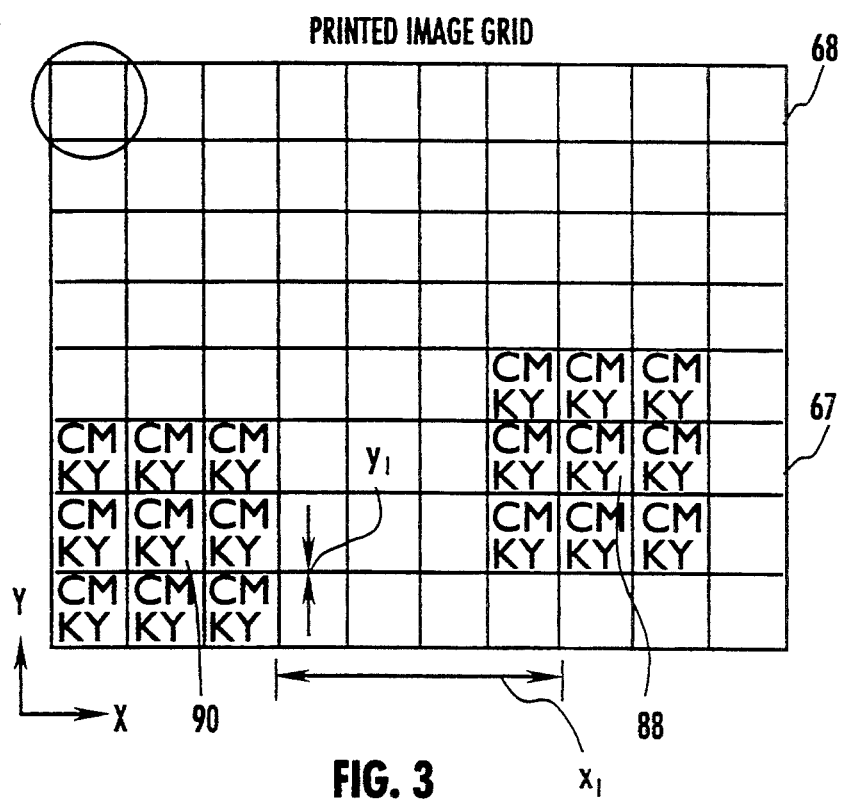

The presently preferred embodiment of the cameras 92, 104, 106, 108 and 110 (see FIGS. 4 and 5) used in camera assembly 36 and scanner 38 include imagers which provide a resolution of 512 pixels by 480 lines (512 pixels×480 pixels). Referring to FIG. 3 and 3A, the presently preferred embodiment focuses the cameras of assembly 36 and scanner 38 such that a 1 inch by 1 inch image scan area 68 is viewed. Accordingly, the data provided to computer 32 by cameras 92, 104, 106, 108 and 110 via image capture circuitry 48 has a resolution representative of 512 pixels per inch along the X axis and 480 pixels per inch along the Y axis. For each image scan area 68 scanned by a camera, the associated image capture circuit board converts the analog camera signal into an 8-bit data word for each of the pixels from the image scan area 68, and stores a 512×512 array of data words for each image scan area 68. The last 32 rows of the 512×512 array are filled with zeros so that the dimensions of the data array are equal for the reasons discussed below.

Thus, in steps 72, 76, 80 and 84 (FIGS. 2A and 2A'), computer 32 stores data for each reference area (image scan areas including all colors printed in the image of interest which are registrable, or image scan areas 68 with the maximum number of registrable colors common to any area) at a resolution of 512 bytes per inch along the X axis and 480 bytes per inch along the Y axis. Referring to the bottom portion of FIG. 3, computer 32 stores data representative of each reference area and the location of the reference area referenced to scan grid 67 (the printed image).

After the printing plates are scanned, the reference areas are established, and the data from the reference areas is stored, the plates are fastened to the plate cylinders 24 and 28 (where two-sided printing is performed). Computer 32 and print unit controller 30 transfer data over data bus 86, and computer 32 controls the times at which the cameras of assembly 36 scan the printed image (may include operating a strobe light 37) on web 12 (scan position). These times are based upon the rotational position of one of the blanket cylinders 22. Computer 32 controls the lateral position of assembly 36 by providing the appropriate signals to camera location unit 34 (Y scan position).

During printing, X and Y printing scan positions are determined by computer 32 based upon the X and Y positions of the reference areas established during plate scanning, the rotational position and speed of one of the blanket cylinders 22, and the orientation of the printing plates on cylinders 24. By way of example, computer 32 may control unit 34 and assembly 36 to scan reference areas 88 and 90 of the printed image (FIG. 3). However, under certain conditions, a primary registration process (described in detail below) may be used to position assembly 36.

As discussed above, the printed image may be scanned during printing at one or more positions; however, the following description will be referenced to the scanning of the two (2) reference areas 88 and 90. Each time a reference area 88 or 90 is scanned by camera assembly 36, the four cameras of assembly 36 apply analog image signals representative of the colors at the reference areas to the respective image capture boards of circuitry 48. Subsequently, the image capture boards convert the analog image signals to digital image data representative of the portion of the printed image in the reference area 88 or 90. Computer 32 then reads the digital image data from the capture boards and stores this data in memory 33.

The following is a description of the manner in which system 10 operates to compare the data produced from the reference areas of the printing plates during printing plate scanning (pre-press image data) and the data produced by scanning the reference areas of the printed image during printing (on-press image data), and using this comparison to register the cyan, magenta, yellow and black printing plates.

Figure 4:
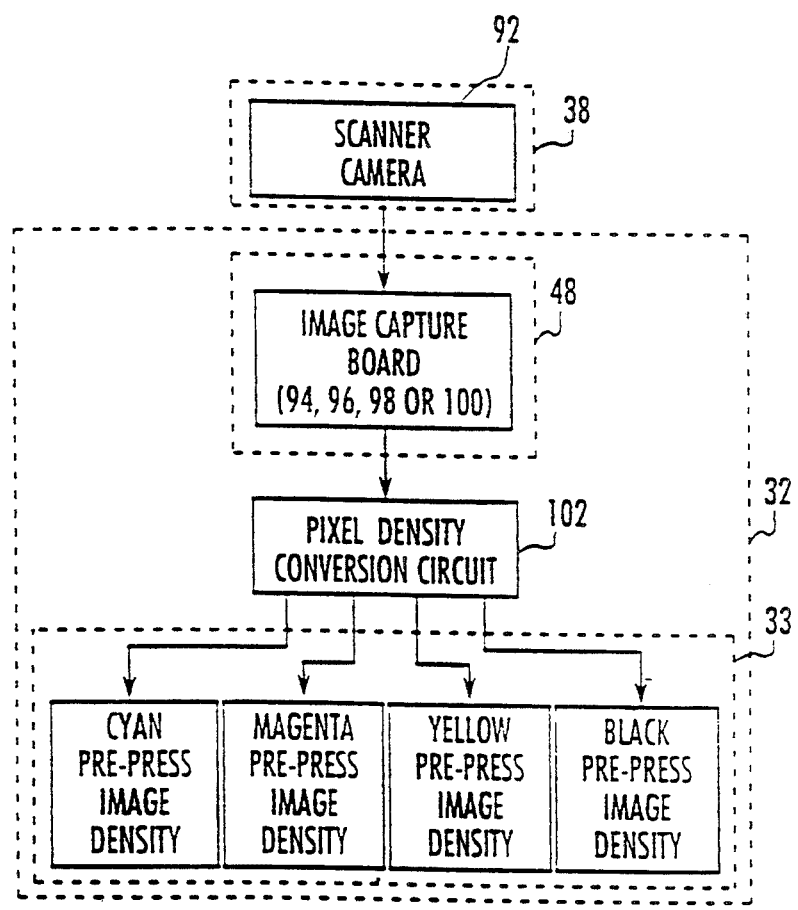
FIG. 4 is a block diagram of scanner camera conversion circuitry.

Before the pre-press and on-press image data is compared, the data is manipulated to provide a format more readily usable for comparison. Referring to FIG. 4, the analog image data from camera 92 of plate scanner 38 is converted to digital image data by one of capture boards 94, 96, 98, 100 of the image capture circuitry 48. This digital image data for each pixel of the camera is then converted to color density values by computer 32 which is programmed to operate as a pixel density conversion circuit 102.

Pixel density conversion is accomplished by calibrating camera 92 of plate scanner 38 for no color (black) and the color of the web (white) and then referencing the image data to the calibration values. Typically, the 8-bit digital image calibration value (K) for black (camera cap on) is between 0 and 10 (decimal) and the 8-bit digital image calibration value (W) for white is between 240 and 250 (decimal).

The following Equation 1 may be used to produce pixel density data (Dp) from the digital image data (P) for each pixel of a reference area.

$$D_p = -\log_{10}\left[\frac{P-K}{W-K}\right] \quad (1)$$

Alternatively, an analog circuit could be used to perform the pixel density conversions. More specifically, an analog circuit including white and black calibration reference voltages could be used to output the $\log_{10}$ of $$\left[\frac{P-K}{W-K}\right],$$

where P is the analog signal from the camera, to produce an analog signal representative of the pixel density. The converted analog signal would then be applied to the image capture board. Additionally, factors such as camera and lighting characteristics may require the use of a different function to produce pixel density data. Furthermore, depending upon the system, satisfactory results may be obtained without converting image color data to pixel density data. In this situation, the processes described below would use image color data in place of pixel density data, and the corresponding reference data would be configured accordingly.

After converting the digital image data for each color (RGBI) at each reference area, the corresponding pixel (image) density data is stored in memory 33.

Figure 5:
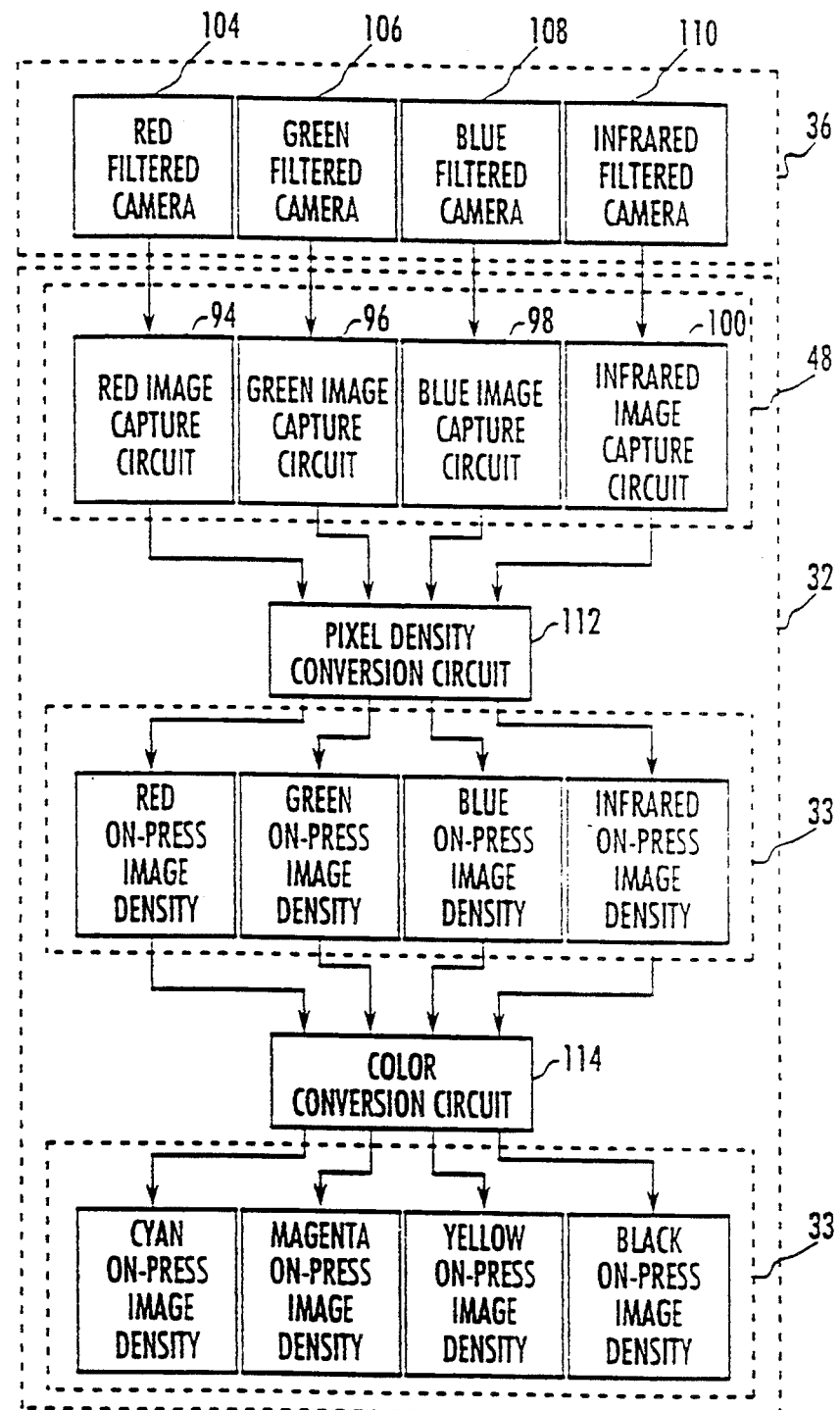
FIG. 5 is a block diagram of converting circuitry for image scanning cameras.

Referring to FIG. 5, the analog image data from the red, green, blue and infrared filtered cameras 104, 106, 108 and 110 of assembly 36 is converted to digital image data by the red, green, blue and infrared image capture circuits 94, 96, 98 and 100 of circuitry 48, respectively. Computer 32 converts the digital image data for RGBI to RGBI image density data (on-press) in accordance with Equation 1 as discussed above, and stores this data in memory 33. (Each camera of assembly 36 will have specific calibration values K and W depending upon the camera.) Subsequent to producing the RGBI on-press image density data, this data is converted to CMYK on-press image density data by computer 32, which is programmed to operate as a color conversion circuit 114.

Computer 32 performs color conversion by multiplying a color separation matrix with the RGBI image density data vector for each pixel from reference areas 88 and 90 to produce a CMYK vector for each pixel in accordance with the following Equation 2:

$$\text{Color Separation Matrix} \quad \begin{matrix} RGBI \\ \text{Vector} \end{matrix} \quad \begin{matrix} CMYK \\ \text{Vector} \end{matrix}$$

$$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix} \times \begin{bmatrix} R \\ G \\ B \\ I \end{bmatrix} = \begin{bmatrix} C \\ M \\ Y \\ K \end{bmatrix} \quad (2)$$

The values $a_{jk}$ depend upon the light at the cameras, the filter characteristics, the ink used for the printed image, and the characteristics of the cameras. Computer 32 stores the color separation matrix data in non-volatile memory since the data only changes if the above-referenced characteristics of the printing system are modified. Computer 32 stores the CMYK image density data in memory 33.

For example, for the cameras and filters discussed above, inks that meet the standard for web offset printing (SWOP), and an assembly 37 having a halogen bulb such as a Bencher Model No. M6769 halogen bulb operating at rated voltage, the values of the separation matrix are:

$$\text{Color Separation Matrix} \quad \begin{matrix} RGBI \\ \text{Vector} \end{matrix} \quad \begin{matrix} CMYK \\ \text{Vector} \end{matrix}$$

$$\begin{bmatrix} 1.599 & -0.066 & 0.006 & -2.909 \\ -0.643 & 1.662 & -0.049 & -2.249 \\ 0.101 & -0.534 & 1.078 & -1.115 \\ -0.047 & -0.032 & -0.004 & 1.751 \end{bmatrix} \times \begin{bmatrix} R \\ G \\ B \\ I \end{bmatrix} = \begin{bmatrix} C \\ M \\ Y \\ K \end{bmatrix} \quad (3)$$

These values will vary as the above-listed variables are modified. For example, if a strobe light is used instead of a halogen bulb, the matrix values would change.

As with the pixel density conversion described in reference to FIG. 4, the pixel density conversion in the arrangement of FIG. 5 could also be performed by an analog circuit before conversion of the analog image data to digital image data. Additionally, an analog circuit could be used to perform color conversion following analog density conversion. Thus, the functions of computer 32 could be reduced to data handling and storage.

Figure 6A:
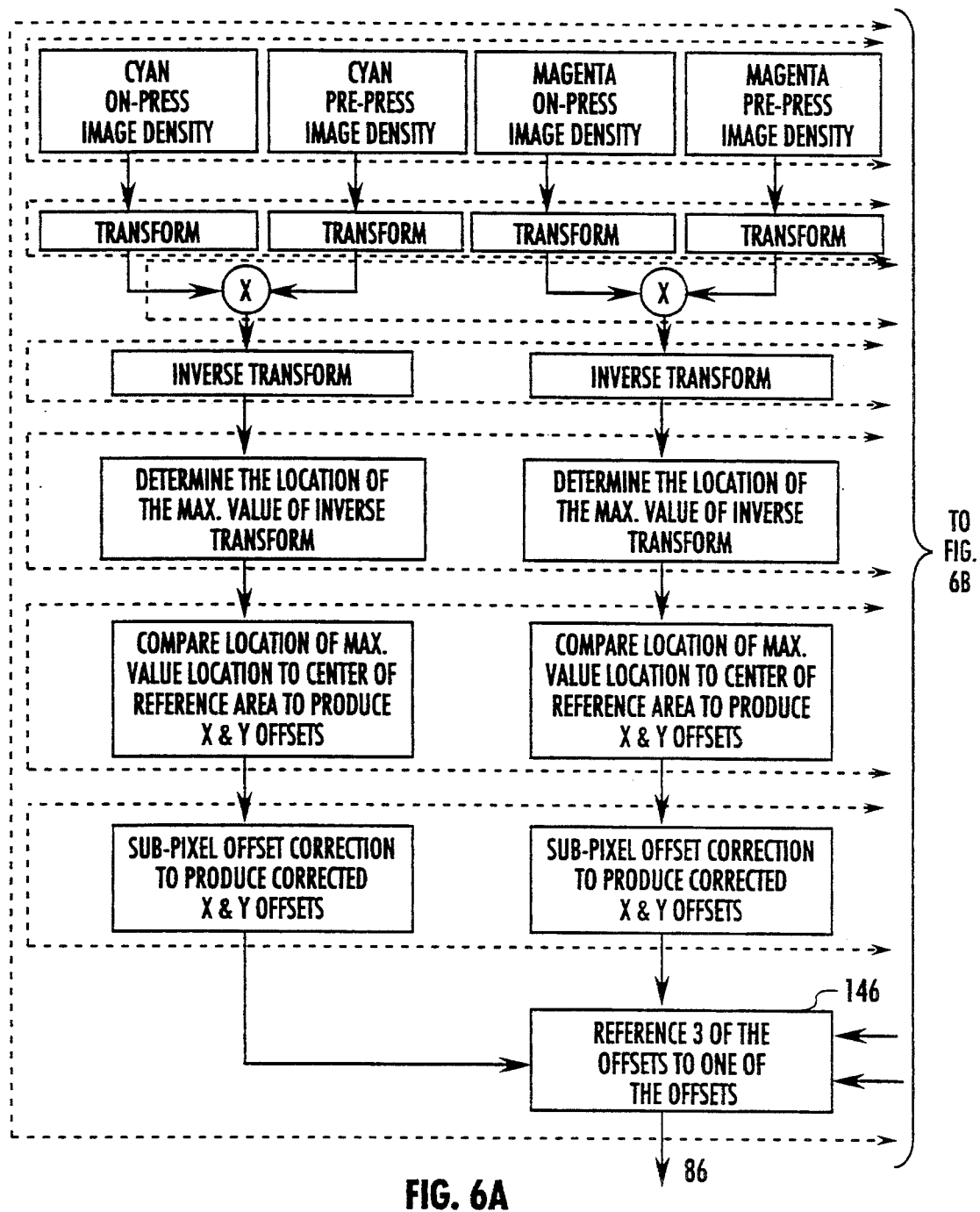
FIGS. 6A and 6B show the left side of a data flow diagram illustrating the comparison of on-press image densities to pre-press image densities to produce color offset data.
Figure 6B:
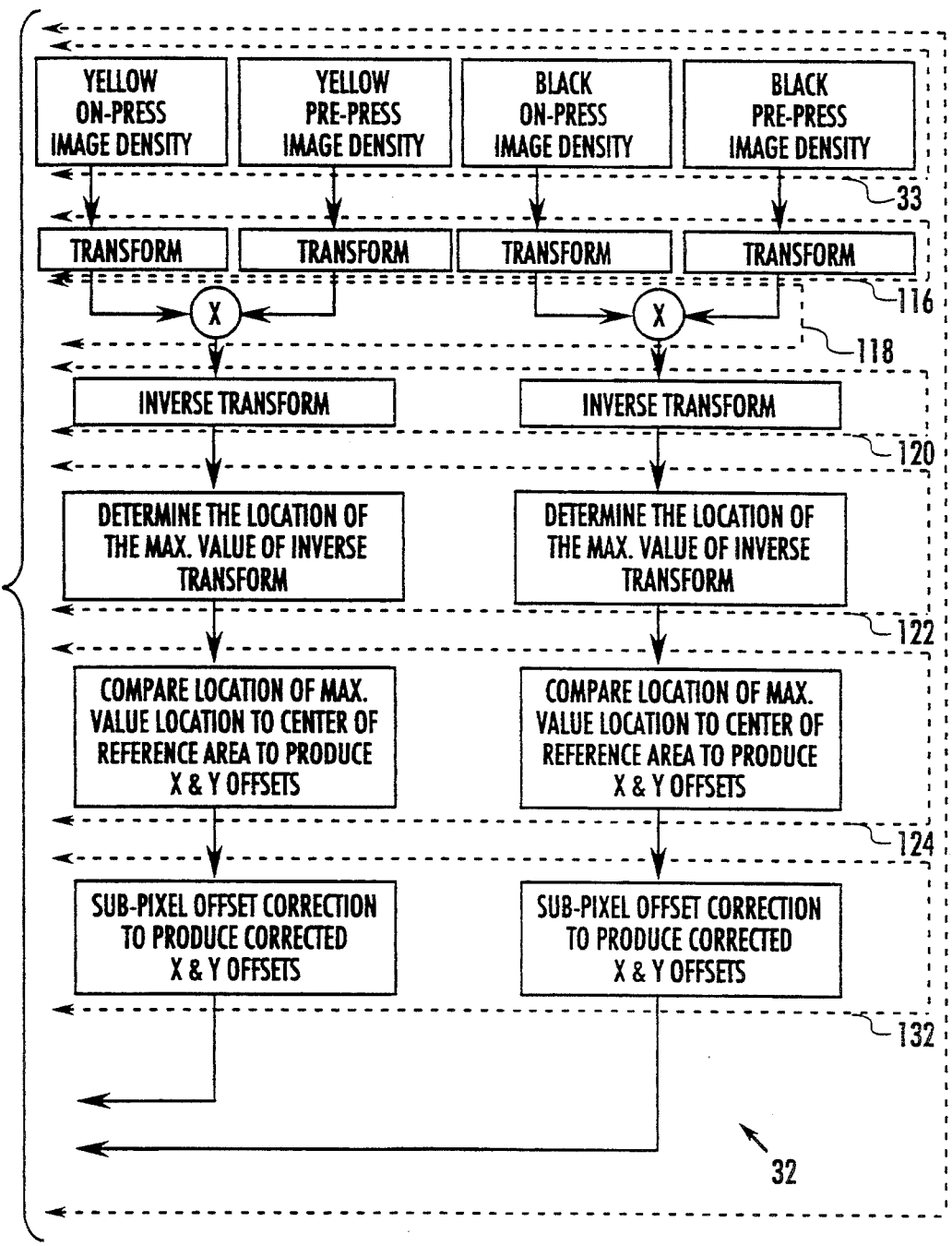

Referring to FIGS. 6A and 6B, computer 32 is also programmed to operate as a circuit which performs two-dimensional cross correlations ("X") using Fourier transforms and inverse Fourier transforms. More specifically, computer 32 is programmed to perform fast Fourier transforms (FFTs) on the on-press and pre-press image density data. (See generally, E. Oran Bingham, "The Fast Fourier Transform," Prentice-Hall Inc., 1974 and William K. Pratt, "Digital Image Processing," 2nd Ed Jolin Wiley & Sons Inc., 1991, pp. 196–203.)

In general, computer 32 compares the CMYK pre-press image density data for the reference areas and the corresponding CMYK on-press image density data for the image scan areas 68 scanned by assembly 38. By way of example, in reference to grid 66 of FIG. 2D, and grid 67 of FIG. 3, computer 32 would compare the image density data from reference areas 87 and 89, and image scan areas 88 and 90 for each of CMYK to determine offsets between CMYK for these areas. To perform the comparisons, computer 32 is programmed to operate as a transform circuit 116, a correlation circuit 118, and an inverse transform circuit 120.

FFTs work on data arrays which have dimensions which are powers of two. Thus, the image density arrays are expanded from 512×480 to 512×512 (discussed above) by adding O's to the bottom of the array before performing the FFTs.

In the presently preferred embodiment, transform circuit 116 takes the fast Fourier transform (FFT) of the pre-press and on-press image density data for each color (CMYK) of the reference areas 87 and 89 and the printed image scan areas 88 and 90. Subsequently, correlation circuit 118 multiplies the complex conjugate of one of the FFTs of the pre-press or on-press image density data with the other of the FFTs of the pre-press or on-press image density data FFTs as follows in Equations 3–10:

area 87 (C)×area 88 (C); (3)
area 87 (M)×area 88 (M); (4)
area 87 (Y)×area 88 (Y); (5)
area 87 (K)×area 88 (K); (6)
area 89 (C)×area 90 (C); (7)
area 89 (M)×area 90 (M); (8)
area 89 (Y)×area 90 (Y); and (9)
area 89 (K)×area 90 (K). (10)

The products of the correlation are stored in 512×512 (N×M) arrays.

Figure 7:
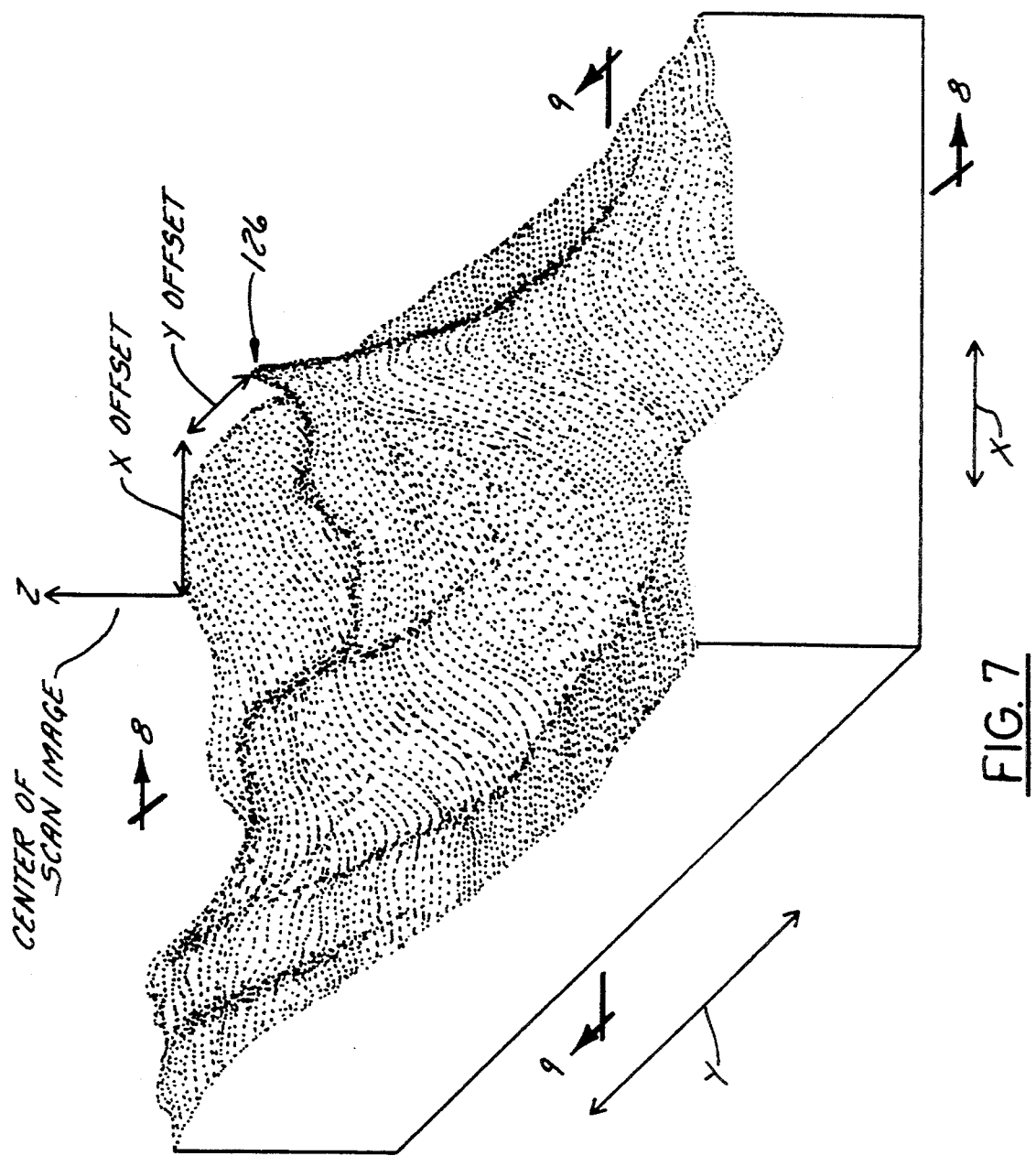
FIG. 7 is a three dimensional graph of inverse transform values of the product of the image intensity transforms for an on-press and pre-press image.

Inverse transform circuit 120 takes the two-dimensional inverse Fourier transforms of the products from Equations 3–10, after which the results of the inverse transforms are stored in memory 33. Referring to FIG. 7, a three-dimensional graph of a cross correlation is shown. ($X_i$ location=$N_i$* 1 inch/512, $Y_j$ location=$M_j$* 1 inch/512, Z location=product for $N_iM_j$). In particular, this is a graph of the cross correlation of image density data for an on-press printed image scan area for one color and a pre-press reference area for that color.

Transform and inverse transform circuits 112 and 116 are not necessary to provide the products discussed above; however, transform and inverse transform circuits 112 and 116 increase the speed at which the cross correlation occurs by reducing the amount of multiplications required. As faster computers 32 become available, circuits 112 and 116 may become unnecessary.

Figure 8:
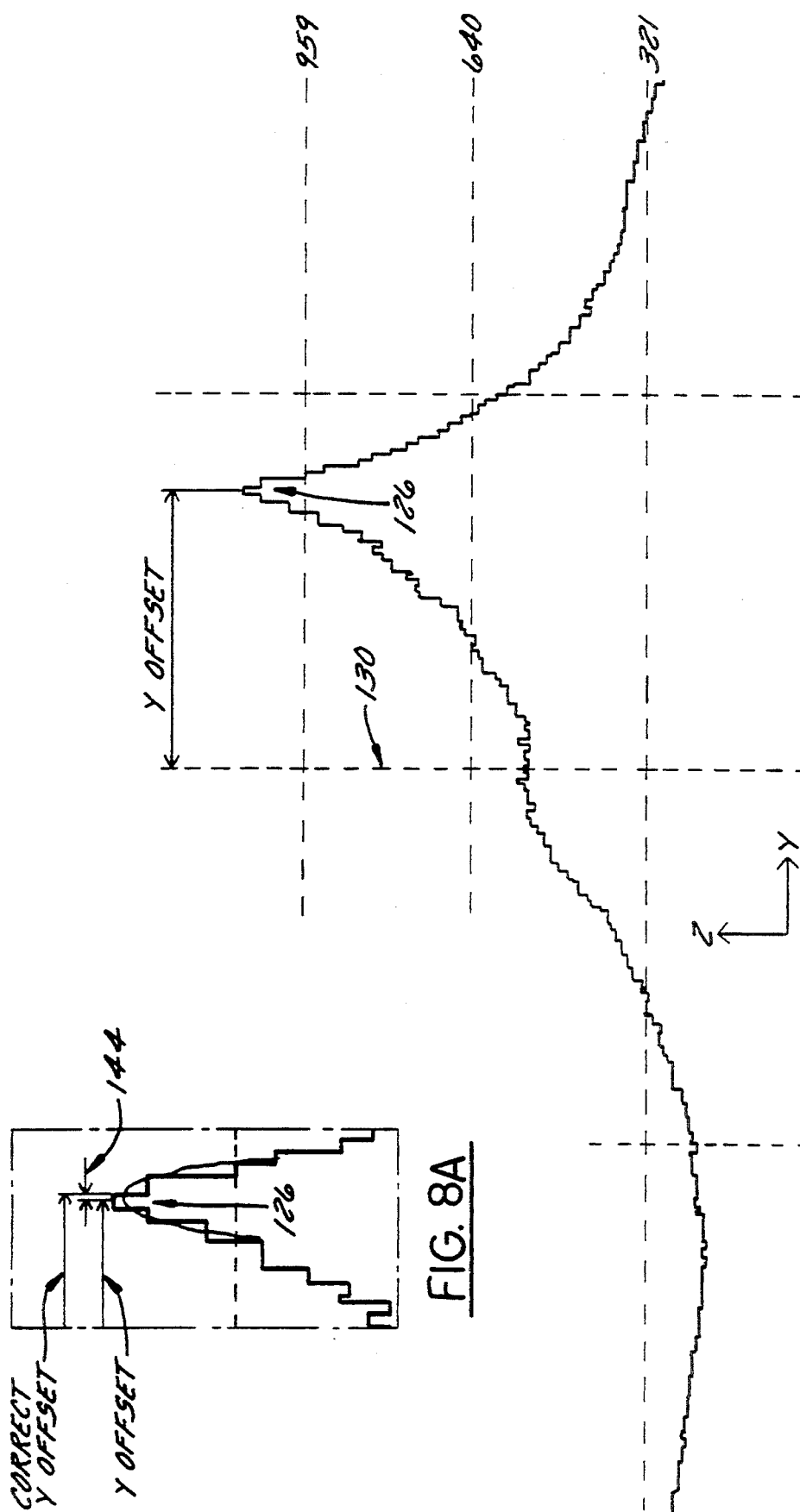
Figure 9:
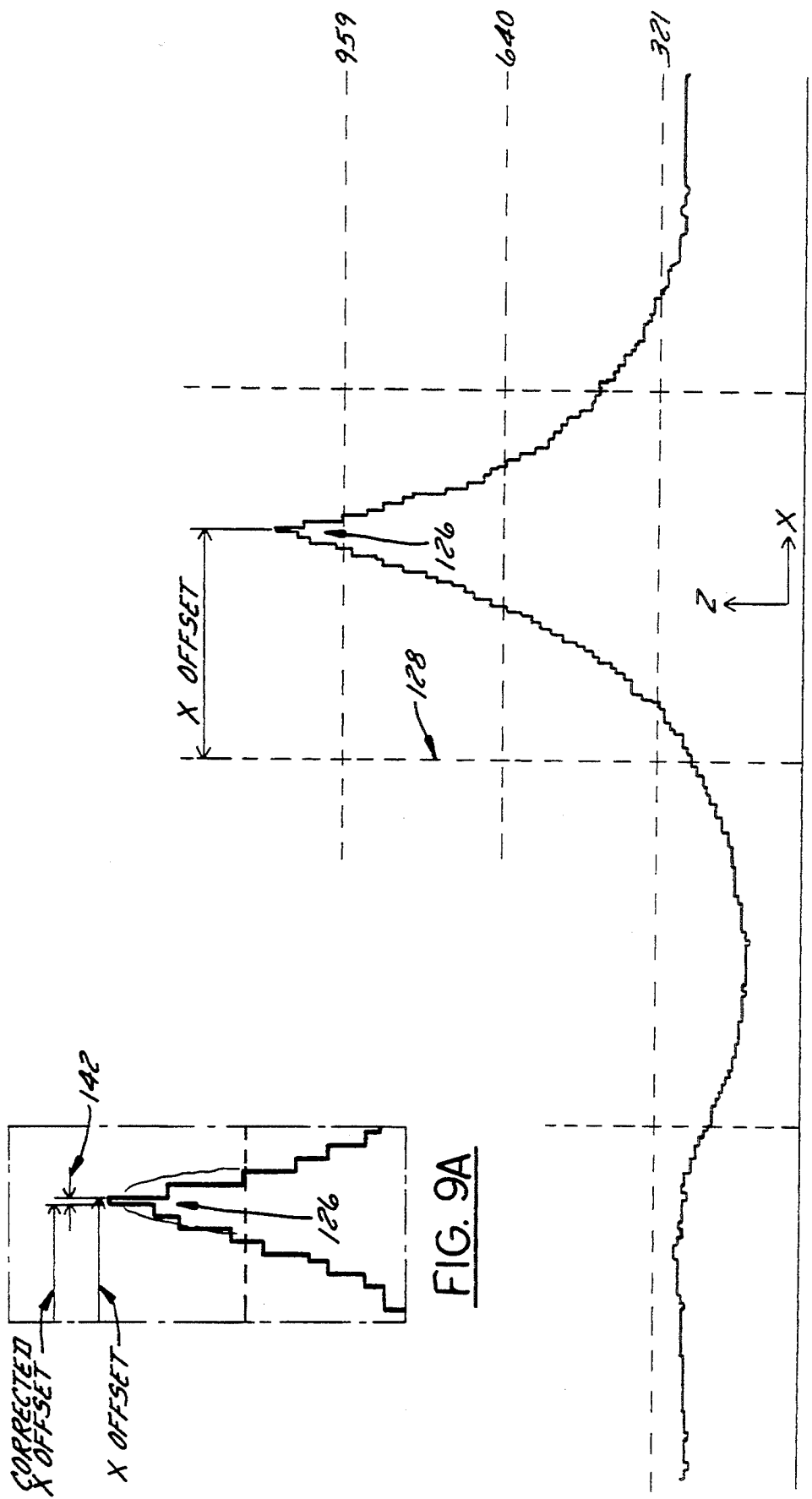
FIG. 9A illustrates an exploded view of the location of the maximum cross correlation value relative to the X axis.

Computer 32 is also programmed to operate as a maximum value determining circuit 122 and a location comparison circuit 124. Referring to FIGS. 7, 8 and 9, FIG. 8 includes a maximum cross correlation value 126 (magnitude in the Z direction) which is located at an X,Y position in the comparison array. The X and Y positions of value 126 are determined by circuit 122 by scanning the values of the comparison array.

FIG. 8 is a two-dimensional view of the graph in FIG. 7 taken along line 8—8 which better illustrates the location of value 126 relative to the Y axis. FIG. 9 is a two-dimensional view of the graph in FIG. 7 taken along line 9—9 which better illustrates the location of value 126 relative to the X axis. Since the comparison array represents the cross correlation of data from the image density arrays, which are 512×512 arrays due to the resolution of cameras 92, 104, 106, 108 and 110 (512×480 pixels) and the zero filling of the 512×480 density arrays to produce 512×512 density arrays which can be manipulated by an FFT, array values in the X and Y directions are for positions of the image scan areas spaced 0.00195 inches (1 inch/512 pixels) apart. Thus, the geometric location of value 126 relative to the X and Y geometric centerlines 128 and 130 (also see FIG. 3) can be readily determined. More specifically, comparison circuit 124 determines the number of comparison array values located between the center of the array and value 126 along the X and Y axes, and multiplies these numbers by 0.00195 inches. For example, if the X offset is 11 values and the Y offset is 7 values, then the offset is 0.0137 inches along the X axis and 0.01365 inches along the Y axis.

Figure 10:
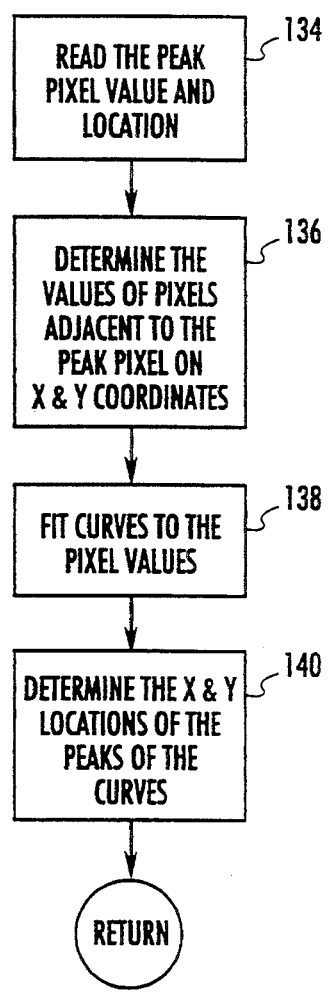
FIG. 10 is a flow chart of a sub-pixel location determination scheme.

To further refine the X and Y offsets, computer 32 is programmed as a curve fitting circuit 132. Referring to FIG. 10, circuit 132 reads value 126, and its X and Y array locations (step 134), and determines the values located at ±n locations along the X and Y axes (step 136) adjacent value 126. After the adjacent values are determined, circuit 132 fits curves to the values along the X and Y axes (step 138, e.g., parabolic curve fit) and determines the locations (X and Y sub-pixel offsets, e.g., lengths 142 and 144) of the maximum values of the X and Y curves in relation to the location of value 126 (step 140, see FIGS. 8 and 9 for a graphical representation). These locations of the maximum values allows the X and Y offsets to be corrected by adding or subtracting the X and Y sub-pixel offsets from the X and Y offsets calculated by circuit 124.

The use of sub-pixel offsets 142 and 144 provides X and Y offsets at a better resolution (better accuracy) than circuit 124 can provide. However, depending upon the pixel resolution of cameras 92, 104, 106, 108 and 110, and/or the system requirements, the additional accuracy in determining the offsets provided may not be required, or may not justify additional processing time.

Subsequent to determining the X and Y offsets for all of the colors (CMYK) between reference areas 87 and 89, and image scan areas 88 and 90, the offsets are referenced to one of the colors of the areas 88 and 90, respectively, by computer 32, which is programmed to operate as a referencing circuit 146. By way of example, if the X and Y offsets are as listed in the following Table 1:

TABLE 1

| AREA 88 | | | AREA 90 | | |
|---|---|---|---|---|---|
| | X Offset | Y Offset | | X Offset | Y Offset |
| CYAN | .01 | .03 | CYAN | .05 | .03 |
| MAGENTA | .04 | .01 | MAGENTA | .03 | .01 |
| YELLOW | .03 | .02 | YELLOW | .04 | .02 |
| BLACK | .05 | .00 | BLACK | .01 | .00 | and the reference color is cyan, then the new offsets would be as listed in the following Table 2:

TABLE 2

| AREA 88 | | | AREA 90 | | |
|---|---|---|---|---|---|
| | $X_{88}$ Offset | $Y_{88}$ Offset | | $X_{90}$ Offset | $Y_{90}$ Offset |
| CYAN | — | — | CYAN | — | — |
| MAGENTA | .03 | −.02 | MAGENTA | −.02 | −.02 |
| YELLOW | .02 | −.01 | YELLOW | −.01 | −.01 |
| BLACK | .04 | −.03 | BLACK | −.04 | −.03 |

Referring back to FIG. 1, computer 32 uses the referenced X and Y offsets and signals representative of the speed and registration of print units 14, 16, 18 and 20 to apply control signals to controller 30, which applies the proper signals to units 14, 16, 18 and 20 to place the colors (CMYK) of the printed image of web 12 into registration.

To perform only color-to-color longitudinal (X) and lateral (Y) registration, only one reference area (87 or 89) and one image scan area (88 or 90, including all printed colors) are required. However, to perform skew registration, two reference areas and two image scan areas are required. More specifically, if the lateral and longitudinal offsets for image scan areas 88 and 90 are different, a skew color-to-color registration correction is required. For example, the skew misregistration angle ($\theta$) for magenta is calculated in the following Equation 11:

$$\theta = \sin^{-1}\left(\frac{y_{90} - y_{88}}{x_1}\right) \quad (11)$$

where $x_1$ is the X distance between areas 88 and 90, $y_{88}$ is the misregistration in the y direction of the magenta color as compared to the reference color (−0.02 in the previous example) (see FIG. 3 for a graphical representation of $x_1$).

Based upon the rotational offsets calculated by computer 32, signals are applied to controller 30 via bus 86 such that rotational color-to-color misregistration between units 14, 16, 18 and 20 is corrected.

The above-described registration system is configured to operate and provide accurate registration between the printed colors of a printed image when the colors printed by printing units 14, 16, 18 and 20 are in substantial registration. However, when the printed colors are not in substantial registration (e.g., during transition periods such as start-up), the misregistration may be so severe that system 10 may be unable to bring the colors into registration. This inability to perform registration typically occurs when the color images in the on-press reference areas 87 and 89 do not partially overlap the corresponding color images in image scan areas 88 and 90.

To respond to substantial misregistrations, system 10 is configured to perform a primary registration process to substantially register the colors of the printed image.

After bringing the printed colors into substantial registration, system 10 uses the registration process described above ("secondary registration") to bring the printed colors into registration with greater precision.

In general, primary registration operates in substantially the same way as secondary registration. However, the reference area for primary registration is larger than the reference area used for secondary registration. Referring to grid 66 of FIG. 2D, reference areas 87a and 89a are used for primary registration. In the present embodiment, areas 87a and 89a are nine (9) times as large as areas 87 and 89. Accordingly, there will be nine (9) times the amount of data stored as a result of scanning the printing plates for areas 87a and 89a.

Image density data for each color in reference areas 87a and 89a is generated in the same manner as for areas 87 and 89, discussed above in reference to FIG. 4. However, since primary registration compares reference areas 87a and 89a to scan image areas 88 and 90, respectively, only 1/9 of the image density data from areas 87a and 89a is needed. More specifically, to compare the image density data from areas 87a and 89a with the image density data from areas 88 and 90, respectively, there should be an equal amount of data representative of the areas.

A number of methods may be used to determine which of the image density data from areas 87a and 89a is used to determine registration offsets in accordance with FIG. 6. For example, the image density data from every third pixel along the X and Y axes may be used as the image density data for areas 87a and 89a. By way of another example, depending upon the printed image, the image density data selected for areas 87a and 89a may be the average of 9 pixels for a 3×3 pixel area or may be a selection of image density data based upon a selection of data toward a particular portion of an image with varying frequencies.

After selecting the image density data for areas 87a and 89a, this data is compared to the on-press image density data for CMYK in the same manner as described in detail in reference to FIG. 6 for the pre-press image density data. During secondary registration, comparison circuit 124 compares the location of the maximum value of the cross correlation process to the location of the center of the pertinent reference area 87 or 89, and during primary registration, circuit 124 compares the location of the maximum value of the cross correlation process to the center of the pertinent reference area 87a or 89a.

Due to the accuracy (i.e., within approximately 3 pixels) of the primary registration process, it may not be useful to utilize the sub-pixel offset correction produced by circuit 132 during primary registration. Rather, primary registration will bring the colors into registration which is close enough that the secondary registration will bring the colors into registration utilizing sub-pixel offset correction.

Depending upon the quality required for a printed image, and the maximum misregistration which can be expected during transient operation of a press, it may be possible to select a size for reference areas 87a and 89a which is large enough to handle the worst case of misregistration, but small enough that secondary registration is not necessary to provide a printed image with satisfactory quality.

The primary registration process can also be used to control camera positioning unit 34 to position assembly 36 to scan portions of a printed image which are suitable for providing registration. Reference areas such as 87a and/or 89a are referenced using primary registration for the purpose of controlling unit 34 to position assembly 36 to scan a selected one of areas 87 or 89 during secondary registration.

As discussed above, only 1/9 of the image density data from reference areas 87a and 89a is used for the primary registration process. To produce the signals necessary to control unit 34 to position assembly 36 in the X direction and properly time strobe assembly 37 (Y direction), computer 32 compares the on-press image density data for one of the colors C, M, Y or K in the area suitable for registration (e.g. 87 or 89) with the image density data for the pertinent reference area (e.g. 87a or 89a). More specifically, comparison circuit 124 compares the location of the maximum value produced by the cross correlation process carried out by circuit 118 on the image density data to the location of the center of the pertinent reference area 87a or 89a.

Based upon the X and Y offsets produced by circuit 124, computer 32 controls unit 34 to properly position assembly 36 in the X direction and properly time strobe assembly 37 (Y direction). Alternatively, the Y position of camera could be controlled, where assembly 37 does not use a strobe.

The microfiche appendix includes the source code listing for the present embodiment of programming (computer program) which configures computer 32 to operate as circuits 112, 114, 116, 118, 120, 122, 124, 132, 134, 136, 138, 140, and 146.

The presently preferred embodiment of a new color-to-color registration system based upon an analysis of the color densities of a portion of a printed image, rather than registration marks or the dot locations of a printed image, has been described above in detail. This description is of one embodiment which is readily modifiable. For example, certain printed images have characteristics which result in printing plates for all colors of the image having substantially the same image shape (i.e., the plates all look the same). In this situation, scanner 38 and the reference area derived therefrom is not necessary. More specifically, digital image data for each color of the printed image is produced as described above in reference to assembly 36, where, instead of initially comparing the on-press data for each color to the associated pre-press data (FIG. 6), the on-press data for the colors is compared to a reference color.

Referring to FIG. 6, and a specific example where the printed image includes CMYK, circuit 116 would only transform on-press image data for CMYK. Circuit 118 would multiply three of the four colors by the fourth color (e.g., cyan) and circuit 120 would take the inverse transforms of the products. Circuits 122, 124 and 132 would operate as described above to determine the X and Y offsets for the three colors. Circuit 146 would not be necessary since three of the colors would already be referenced to the fourth (reference color) of the printed data. Based upon the X and Y offsets between the reference color and the other colors of the image, computer 32 and controller 30 operate to correct misregistration between print units.

By way of further modification, a particular application may be optimized by performing a function on the pre-press and on-press image density values other than correlation. More specifically, a particular application may be better optimized by using the sum of the squares of the differences of corresponding image density values.

These and other modifications may be made without departing from the spirit or scope of the invention.

What is claimed is:

1. A system for generating a signal representative of color registration offset between at least first and second colors of an image printed on a web, where a first printing unit prints the first color of the image and a second printing unit prints the second color of the image, the system comprising:

a memory disposed to store a first reference array of digital data representative of a predetermined color density of the first color of at least a portion of the image and a second reference array of digital data representative of a predetermined color density of the second color of the portion;

an imaging device in optical communication with the web to produce a first analog signal representative of the first color of the portion of the image and a second analog signal representative of the second color of the portion;

a converter circuit, operatively associated with the imaging device and memory, which converts the first analog signal to a first color array of digital data, and converts the second analog signal to a second color array of digital data, where the first and second color arrays are stored in the memory; and a processing circuit in communication with the converter circuit and the memory, the processing circuit further comprising a density conversion circuit which converts the first color array of digital data into a first density array of digital data representative of the color density of the first color and converts the second color array of digital data into a second density array of digital data representative of the color density of the second color, where the processing circuit compares the first reference array with the first density array and compares the second reference array with the second density array to determine a registration offset between the first and second colors and produces a signal representative the registration offset between the colors.

2. The system of claim 1, wherein the processing circuit further comprises:

a correlation circuit which correlates the first reference array and the first density array to produce a first product array, and correlates the second reference array and the second density array to produce a second product array;

a maximum value determining circuit which determines the maximum values in the first and second product arrays; and a comparison circuit which compares the positions of the maximum values relative to the first and second product arrays to determine the registration offset between the colors.

3. The system of claim 1, wherein the processing circuit further comprises:

a transform circuit disposed to transform the data in the reference arrays and density arrays to data referenced to a frequency domain;

a correlation circuit which correlates the transformed data from the first reference array and the first density array to produce a first product array, and correlates transformed data from the second reference array and the second density array to produce a second product array;

an inverse transform circuit disposed to transform the data in the product arrays to data referenced to a spatial domain;

a maximum value determining circuit which determines the maximum values in the first and second product arrays; and a comparison circuit which compares the positions of the maximum values relative to the first and second product arrays to determine the registration offset between the colors.

4. The system of claim 3, wherein the transform circuit is a fast Fourier transform circuit and the inverse transform circuit is an inverse fast Fourier transform circuit.

5. The system of claim 1, wherein the reference and density arrays are N x M arrays, the portion is A units wide along an X axis and B units wide along a Y axis, the N dimension of each array is associated with the X axis, the M dimension of each array is associated with the Y axis, and the processing circuit further comprises:

a correlation circuit which correlates the first reference array and the first density array to produce a first product array, and correlates the second reference array and the second density array to produce a second product array;

a maximum value determining circuit which determines the Nmax and Mmax locations of the maximum values in the first and second product arrays, determines adjacent values at +/− n locations about the Nmax and Mmax locations, fits curves to the Nmax and adjacent values, and the Mmax and adjacent values, and determines the peaks of the curves in reference to Nmax and Mmax in terms of units along the X and Y axes; and a comparison circuit which compares the positions of the peaks to determine the registration offset between the colors in terms of units along the X and Y axes.

6. A system for generating signals representative of color registration offsets between cyan, magenta, yellow and black inks of a printed image, where first, second, third and fourth printing units are disposed to print cyan, magenta, yellow and black ink on a web, the system comprising:

a memory which stores first, second, third and fourth reference array of digital data representative of the desired color densities of the cyan, magenta, yellow and black inks in at least a portion of a printed image, respectively;

an imaging device in optical communication with the web to produce a first, second, third and fourth analog signals representative of the cyan, magenta, yellow and black inks, respectively, in the portion of the image;

a converter circuit, operatively associated with the memory and imaging device, which converts the first, second, third and fourth analog signals to cyan, magenta, yellow and black arrays of digital data respectively, where the cyan, magenta, yellow and black arrays are stored in the memory; and a processing circuit in communication with the converter circuit and the memory to convert the cyan, magenta, yellow and black arrays of digital data into cyan, magenta, yellow and black density arrays of digital data representative of the color densities of the cyan, magenta, yellow and black inks, respectively, where the processing circuit compares the cyan, magenta, yellow and black reference and density arrays to determine registration offsets between the cyan, magenta, yellow and black inks.

7. The system of claim 6, wherein the processing circuit further comprises:

a correlation circuit which correlates the cyan, magenta, yellow and black reference and density arrays, respectively, to produce cyan, magenta, yellow and black product arrays;

a maximum value determining circuit which determines the maximum values in the product arrays; and a comparison circuit which compares the positions of the maximum values of three of the product arrays with one of the product arrays to determine the registration offset between the cyan, magenta, yellow and black inks as referenced to one of the inks.

8. The system of claim 6, wherein the processing circuit further comprises:

a transform circuit disposed to transform the data in the reference arrays and density arrays to data referenced to a frequency domain;

a correlation circuit which correlates the transformed data from cyan, magenta, yellow and black reference and density arrays, respectively, to produce cyan, magenta, yellow and black product arrays;

an inverse transform circuit disposed to transform the data in the product arrays to data referenced to a spatial domain;

a maximum value determining circuit which determines the maximum values in the product arrays; and a comparison circuit which compares the positions of the maximum values of three of the product arrays with one of the product arrays to determine the registration offset between the cyan, magenta, yellow and black inks as referenced to one of the inks.

9. The system of claim 8, wherein the transform circuit is a fast Fourier transform circuit and the inverse transform circuit is an inverse fast Fourier transform circuit.

10. The system of claim 6, wherein the reference and density arrays are N x M arrays, the portion of the printed image is A units wide along an X axis and B units wide along a Y axis, the N dimension of each array is associated with the X axis, the M dimension of each array is associated with the Y axis, and the processing circuit further comprises:

a correlation circuit which correlates the cyan, magenta, yellow and black reference and density arrays, respectively, to produce cyan, magenta, yellow and black product arrays;

a maximum value determining circuit which determines the Nmax and Mmax locations of the maximum values in the product arrays, determines adjacent values at +/−n locations about the Nmax and Mmax locations, fits curves to the Nmax and adjacent values, and the Mmax and adjacent values, and determines the peaks of the curves in reference to Nmax and Mmax in terms of units along the X and Y axes; and a comparison circuit which compares the positions of the peaks to determine the registration offset between the colors in terms of units along the X and Y axes.

11. A system for scanning a printed image composed of at least two colors and determining the registration offset between the two colors, the system comprising:
- a scanner including a scanner output, where the scanner is disposed to scan at least a portion of the printed image and produce a first signal at the scanner output representative of a first color at a plurality of locations of the portion and produce a second signal at the scanner output representative of a second color at the locations of the portion;
- a memory, coupled to the scanner output, which stores a first value representative of a first reference signal produced at the scanner output in response to scanning a first reference color and a second value representative of a second reference signal produced at the scanner output in response to scanning a second reference color;
- a pixel density conversion circuit including a pixel color density output and coupled to the scanner and the memory, where the conversion circuit outputs first pixel density values referenced to the locations and based upon the first reference value, the second reference value and the first signal, and outputs second pixel density values referenced to the locations and based upon the first reference value, the second reference value and the second signal;
- a relational circuit coupled to the pixel density output and including a product output, where the relational circuit outputs a third value for each location based upon the first and second pixel density values;
- a determining circuit coupled to the relational circuit which outputs a location value representative of the location of a predetermined characteristic of the third values; and
- an offset circuit coupled to the determining circuit which compares the location value to the portion, and outputs at least one offset value.

12. The system of claim 11, wherein the locations are associated with pixel locations of the scanner, the first reference color is black, and the second reference color is white.

13. The system of claim 11, wherein the relational circuit comprises a correlator disposed to correlate first and second pixel density values.

14. The system of claim 13, wherein the determining circuit further comprises a comparing circuit disposed to compare the third values and determine the maximum third value and the associated location value.

15. The system of claim 11, wherein the portion includes a center and the offset circuit compares the location value to the center.

16. The system of claim 11, wherein the relational circuit further comprises:
- a transform circuit disposed to transform the pixel density values to values referenced to a frequency domain,
- a correlating circuit which correlates the transformed first and second pixel density values to produce the third values for each location, and
- an inverse transform circuit disposed to transform the third values to values referenced to a spatial domain; and
- the determining circuit comprises a maximum value determining circuit which determines the maximum third value and the associated location value.

17. The system of claim 16, wherein the transform circuit is a fast Fourier transform circuit and the inverse transform circuit is an inverse fast Fourier transform circuit.

18. A system for generating a signal representative of color registration offset between at least first and second colors of an image printed on a web, where a first printing unit prints the first color of the image and a second printing unit prints the second color of the image, the system comprising:
- a memory which stores a first reference array of digital data representative of a predetermined color density of the first color in at least a portion of the image and a second reference array of digital data representative of the predetermined color density of the second color of the portion;
- an imaging device in optical communication with the web to produce a first analog signal representative of the first color of an area of the portion of the image and a second analog signal representative of the second color of the area;
- a converter circuit, operatively associated with the imaging device, which converts the first analog signal to a first color array of digital data, converts the second analog signal to a second color array of digital data, and stores the first and second color arrays; and
- a processing circuit in communication with the converter circuit and the memory, the processing circuit further comprising a density conversion circuit which converts the first color array of digital data into a first density array of digital data representative of the color density of the first color and converts the second color array of digital data into a second density array of digital data representative of the color density of the second color, where the processing circuit compares the first reference array with the first density array and compares the second reference array with the second density array to determine a registration offset between the first and second colors and produces a signal representative of the registration offset.

19. The system of claim 18, wherein the processing circuit further comprises:
- a correlation circuit which correlates the first reference array and the first density array to produce a first product array, and correlates the second reference array and the second density array to produce a second product array;
- a maximum value determining circuit which determines the maximum values in the first and second product arrays; and
- a comparison circuit which compares the positions of the maximum values relative to the first and second product arrays to determine the registration offset between the colors.

20. The system of claim 18, wherein the processing circuit further comprises:
- a transform circuit disposed to transform the data in the reference arrays and density arrays to data referenced to a frequency domain;
- a correlation circuit which correlates the transformed data from the first reference array and the first density array to produce a first product array, and correlates transformed data from the second reference array and the second density array to produce a second product array;

an inverse transform circuit disposed to transform the data in the product arrays to data referenced to a spatial domain;

a maximum value determining circuit which determines the maximum values in the first and second product arrays; and a comparison circuit which compares the positions of the maximum values relative to the first and second product arrays to determine the registration offset between the colors.

21. The system of claim 20, wherein the transform circuit is a fast Fourier transform circuit and the inverse transform circuit is an inverse fast Fourier transform circuit.

22. A system for generating a signal representative of color registration rotational offset between at least first and second colors of an image printed on a web, where a first printing unit prints the first color of the image and a second printing unit prints the second color of the image, the system comprising:

a memory disposed to store a first reference array of digital data representative of a predetermined color density of the first color of at least first and second portions of the image and a second reference array of digital data representative of a predetermined color density of the second color of the first and second portions, where the first portion is displaced from the second portion;

an imaging device in optical communication with the web to produce a first analog signal representative of the first color of the portions and a second analog signal representative of the second color of the portions;

a converter circuit, operatively associated with the imaging device and memory, which converts the first analog signal to a first color array of digital data, and converts the second analog signal to a second color array of digital data, where the first and second color arrays are stored in the memory; and a processing circuit in communication with the converter circuit and the memory, the processing circuit further comprising a density conversion circuit which converts the first color array of digital data into a first density array of digital data representative of the color density of the first color and converts the second color array of digital data into a second density array of digital data representative of the color density of the second color, where the processing circuit compares the first reference array with the first density array and compares the second reference array with the second density array to determine registration offsets between the first and second colors at the first and second portions, and to produce a signal representative the rotational offset between the colors based upon the first and second offsets.

23. The system of claim 22, wherein the processing circuit further comprises:

a correlating circuit which correlates the first reference array and the first density array to produce first and second product arrays, and correlates the second reference array and the second density array to produce third and fourth product arrays;

a maximum value determining circuit which determines the maximum values in the product arrays; and a comparison circuit which compares the positions of the maximum values relative to the respective product arrays to determine the registration offsets between the colors at the first and second positions.

24. The system of claim 22, wherein the processing circuit further comprises:

a transform circuit disposed to transform the data in the reference arrays and density arrays to data referenced to a frequency domain;

a multiplying circuit which multiplies the transformed data from the first reference array and the first density array to produce first and second product arrays, and multiplies transformed data from the second reference array and the second density array to produce third and fourth product arrays;

an inverse transform circuit disposed to transform the data in the product arrays to data referenced to a spatial domain;

a maximum value determining circuit which determines the maximum values in the product arrays; and a comparison circuit which compares the positions of the maximum values relative to the respective product arrays to determine the registration offset between the colors at the first and second positions.

25. The system of claim 22, wherein the transform circuit is a fast Fourier transform circuit and the inverse transform circuit is an inverse fast Fourier transform circuit.

26. A system for positioning an imaging device relative to a printed image along at least one axis of the image, where the device is positioned by a positioning unit and the assembly scans an area of the printed image; the system comprising:

a memory which stores a reference array of digital data representative of a predetermined color density of a color in at least a portion of the printed image, where the imaging device is in optical communication with the image and produces an analog signal representative of the color of an area of the portion;

a converter circuit, operatively associated with the imaging device, which converts the analog signal to a color array of digital data, and stores the color array; and a processing circuit and memory, the processing circuit further comprising a density conversion circuit which converts the color array into a density array of digital data representative of the color density of the color, where the processing circuit compares the reference and density arrays to determine a spatial relationship between the area and the portion along one axis and produces a control signal, based upon the spatial relationship, to control the positioning unit.

27. The system of claim 26, wherein the imaging device includes a strobe light coupled to the processing circuit and timed by the control signal to illuminate a predetermined area of the portion.

28. The system of claim 26, wherein the processing circuit further comprises:

a correlation circuit which correlates the reference array and the density array to produce a product array;

a maximum value determining circuit which determines the maximum values in the product array; and a comparison circuit which compares the position of the maximum value relative to the portion to determine the spatial relationship.

29. A system for generating a signal representative of color registration offset between at least first and second colors of an image printed on a web, where a first printing unit prints the first color of the image and a second printing unit prints the second color of the image, the system comprising:

a memory disposed to store a first reference array of digital data representative of the first color of at least a portion of the image and a second reference array of digital data representative of the second color of the portion;

an imaging device in optical communication with the web to produce a first analog signal representative of the first color of the portion of the image and a second analog signal representative of the second color of the portion;

a converter circuit, operatively associated with the imaging device and memory, which converts the first analog signal to a first color array of digital data, and converts the second analog signal to a second color array of digital data, where the first and second color arrays are stored in the memory; and a processing circuit in communication with the converter circuit and the memory, where the processing circuit compares the first reference array with the first color array and compares the second reference array with the second color array to determine a registration offset between the first and second colors and produces a signal representative the registration offset between the colors.

30. The system of claim 29, wherein the processing circuit further comprises:

a correlation circuit which correlates the first reference array and the first color array to produce a first product array, and correlates the second reference array and the second color array to produce a second product array;

a maximum value determining circuit which determines the maximum values in the first and second product arrays; and a comparison circuit which compares the positions of the maximum values relative to the first and second product arrays to determine the registration offset between the colors.

31. The system of claim 29, wherein the processing circuit further comprises:

a transform circuit disposed to transform the data in the reference arrays and color arrays to data referenced to a frequency domain;

a correlation circuit which correlates the transformed data from the first reference array and the first color array to produce a first product array, and correlates transformed data from the second reference array and the second color array to produce a second product array;

an inverse transform circuit disposed to transform the data in the product arrays to data referenced to a spatial domain;

a maximum value determining circuit which determines the maximum values in the first and second product arrays; and a comparison circuit which compares the positions of the maximum values relative to the first and second product arrays to determine the registration offset between the colors.

32. The system of claim 31, wherein the transform circuit is a fast Fourier transform circuit and the inverse transform circuit is an inverse fast Fourier transform circuit.

33. The system of claim 29, wherein the reference and color arrays are N×M arrays, the portion is A units wide along an X axis and B units wide along a Y axis, the N dimension of each array is associated with the X axis, the M dimension of each array is associated with the Y axis, and the processing circuit further comprises:

a correlation circuit which correlates the first reference array and the first color array to produce a first product array, and correlates the second reference array and the second color array to produce a second product array;

a maximum value determining circuit which determines the Nmax and Mmax locations of the maximum values in the first and second product arrays, determines adjacent values at +/− n locations about the Nmax and Mmax locations, fits curves to the Nmax and adjacent values, and the Mmax and adjacent values, and determines the peaks of the curves in reference to Nmax and Mmax in terms of units along the X and Y axes; and a comparison circuit which compares the positions of the peaks to determine the registration offset between the colors in terms of units along the X and Y axes.

* * * * *